United States Patent [19]

Stec

[11] Patent Number: 5,181,728
[45] Date of Patent: Jan. 26, 1993

[54] TRENCHED BRUSH SEAL

[75] Inventor: Philip F. Stec, Medford, Mass.

[73] Assignee: General Electric Company, Cincinnati, Ohio

[21] Appl. No.: 764,289

[22] Filed: Sep. 23, 1991

[51] Int. Cl.$^5$ .................. F16J 15/447; F01D 11/02
[52] U.S. Cl. .................................. 277/53; 277/167.3
[58] Field of Search ........................ 277/53-57, 277/167.3; 415/174.2, 174.5, 173.5

[56] References Cited

U.S. PATENT DOCUMENTS

| | | | |
|---|---|---|---|
| 1,316,964 | 9/1919 | London | 277/57 |
| 1,895,348 | 1/1933 | Schlegel et al. | 277/56 |
| 3,917,150 | 11/1975 | Ferguson et al. | 228/159 |
| 4,202,554 | 5/1980 | Snell | 277/53 |
| 4,209,268 | 6/1980 | Fujiwara et al. | 405/147 |
| 4,358,120 | 11/1982 | Moore | 277/53 X |
| 4,370,094 | 1/1983 | Ambrosch et al. | 415/174.5 X |
| 4,411,594 | 10/1983 | Pellow et al. | 415/174 |
| 4,457,515 | 7/1984 | Eidschun | 277/53 X |
| 4,600,202 | 7/1986 | Schaeffler | 277/53 |
| 4,756,536 | 7/1988 | Belcher | 277/53 |
| 4,781,388 | 11/1988 | Wohrl et al. | 277/53 |
| 4,940,080 | 7/1990 | Reeves et al. | 165/9 |
| 4,971,336 | 11/1990 | Ferguson | 277/53 |
| 4,998,739 | 3/1991 | Weiler | 277/53 |
| 5,026,252 | 6/1991 | Hoffelner | 415/174.2 |
| 5,029,876 | 7/1991 | Orlando et al. | 277/56 |

FOREIGN PATENT DOCUMENTS

| | | |
|---|---|---|
| 3828363 | 2/1990 | Fed. Rep. of Germany . |
| 0002274 | of 1909 | United Kingdom ................ 277/56 |

*Primary Examiner*—William A. Cuchlinski, Jr.
*Assistant Examiner*—James K. Folker
*Attorney, Agent, or Firm*—Jerome C. Squillaro; Nathan D. Herkamp

[57] ABSTRACT

An improved seal apparatus is disclosed in which the distal ends of compliant bristle elements of a conventional brush seal are disposed in a groove in adjacent structure, further being characterized by lack of contact between the bristles and structure during steady state operation of the apparatus in which the seal is installed. Sealing is afforded by the tortuosity of the leakage path. Degradation of the seal due to wear of the bristles is markedly reduced. Multiple seals in one or more constant dimension or stepped dimension grooves is also contemplated.

9 Claims, 4 Drawing Sheets

TRENCHED BRUSH SEAL

TECHNICAL FIELD

The present invention relates generally to pressure seals in gas turbine engines and more specifically to an improved configuration brush seal apparatus for both dynamic and static sealing applications.

BACKGROUND INFORMATION

Sealing between static and high speed rotating parts in a gas turbine engine presents a formidable challenge. Rotational speeds in excess of 30,000 rpm for gas generator rotors in small engines is not uncommon. In order that seal wear is minimized, seal elements can be spaced apart allowing for a small controlled amount of leakage flow; however, differing rates of thermal growth between rotor and static structures during transient operating conditions directly affects intercomponent clearances. Additionally, there are rotor eccentricities which must be accounted for as well as a limited amount of mechanical inertial growth. In order to provide an acceptable degree of sealing for both steady state and transient operating conditions, labyrinth seals are commonly used. Typically, the sharp toothed portion of the seal is mounted on the rotating component with an abradable honeycomb or other sacrificial material disposed radially outward to from the land. During certain transient operating conditions clearances are reduced. When there is interference, oftentimes referred to as negative clearance, the sharp teeth wear permanent grooves in the land. As a direct consequence, once steady state operation has resumed, while the clearance between the rotor and stator has returned to nominal, leakage through the seal has increased. Excessive rubbing may cause overheating, degradation and wear of the rotating seal teeth themselves, further increasing leakage. When designing with labyrinth seals, those skilled in the art must compensate for seal degradation by providing sufficient margin in the secondary flow system. In a blade cooling circuit in a new engine, for example, more cooling air than required will be supplied to the blades. Upon degradation of the seal, however, sufficient secondary flow will remain so that hot primary flow gas is not ingested into blade cooling circuits. This additional secondary flow required is not available for combustion and represents a direct parasitic loss in engine efficiency.

Another problem with labyrinth seals is that the complex machining of the seal teeth is typically one of the final operations performed on costly rotating parts which are subject to very high stresses during operation. Any errors which occur at this point could cause the part to be scrapped, or require repair, both at significant cost. The seal teeth are also prone to damage due to mishandling during engine assembly or disassembly.

Another apparatus employed for sealing between high speed rotating and static parts is brush seals. These seals are comprised of a plurality of compliant bristles which extend generally radially inwardly from an annular ring to which they are permanently affixed. The ring is clamped or otherwise fixedly attached to a static member and circumscribes and is concentric with a rotating member or shaft. The brush seal is sized so that the bristles are biased against the shaft, often being canted in the direction of rotation of the shaft. During operation, the bristles rub against the shaft, compliantly deforming due to thermal growth and orbiting of the shaft, thereby maintaining their sealing capability. Unlike permanently grooved labyrinth seal lands, brush seals retain their sealing effectiveness after periods of reduced clearance.

A fundamental problem with conventional brush seal applications however is wear of the bristles. Significant effort has been expended by those skilled in the art in an attempt to define the optimal orientation, size, number, packing density and material of the bristles as well as the amount of dimensional interference with the rotating member so as to provide reasonable sealing effectiveness while achieving an acceptable level of seal wear. Such combinations however fail to address the rudimentary issue that persistent rubbing induces wear. Further, to prevent wear damage to or overheating of the highly stressed rotating member, the land on which the bristles rub is typically coated with a layer of hard ceramic or other protective material so that substantially all wear occurs in the seal bristles. So while the brush seal, due to its compliant nature, initially affords improved sealing over labyrinth seals, bristles wear results in increasing leakage with time. Further, it is contemplated that when worn, the brush seal affords poorer sealing capability than a similarly worn labyrinth seal, the leakage path for the latter being generally longer and more tortuous. As such, the use of conventional brush seal apparatus requires substantially similar excess design margin in the secondary flow as labyrinth seals, so that no permanent gain in overall engine efficiency can be realized.

OBJECT OF THE INVENTION

Accordingly, the object of the present invention is to provide a seal apparatus which exhibits improved life by substantially eliminating seal wear thereby achieving a relatively constant steady state leakage flow. When used in a gas turbine engine, an appreciable increase in engine efficiency can be realized due to minimization of parasitic loss associated with secondary flow margin required to compensate for increasing leakage due to progressive seal wear in systems with conventional sealing apparatuses.

SUMMARY OF THE INVENTION

The seal apparatus is comprised of a conventional annular brush seal fixedly attached to a static structure. In the preferred embodiment, the distal ends of the radially inwardly directed compliant bristles are disposed in a groove or trench in an adjacent structure. The configuration is characterized by the absence of contact between the bristles and the adjacent structure in the nominal steady state, where a small, but finite clearance exists. The trenched structure may be substantially fixed with respect to the static structure, with relative movement being the result, for example, of vibration or variation in thermal growth, or the structure may rotate. In the nominal steady state, the amount of leakage is controlled by the resistance inherent in the narrow sizing and tortuosity of the circuitous path along which the fluid must travel. During intermittent periods of increased clearance between the bristles and adjacent structure, resistance to flow and therefore sealing efficiency decreases. Similarly, during periods of decreased clearance or interference, sealing efficiency increases; however, since contact between the bristles and adjacent structure is restricted to short intermittent periods of interference, wear is greatly reduced and the useful life of the seal apparatus is maximized. Similarly, friction induced heating, which heretofore prevented the use of brush seals in large diameter, high rotational speed applications is minimized. To further reduce leakage flow, to provide redundancy, or for higher pressure applications, multiple brush seals can be arranged in series in a single trench or in multiple trenches as well as at differing diameters.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
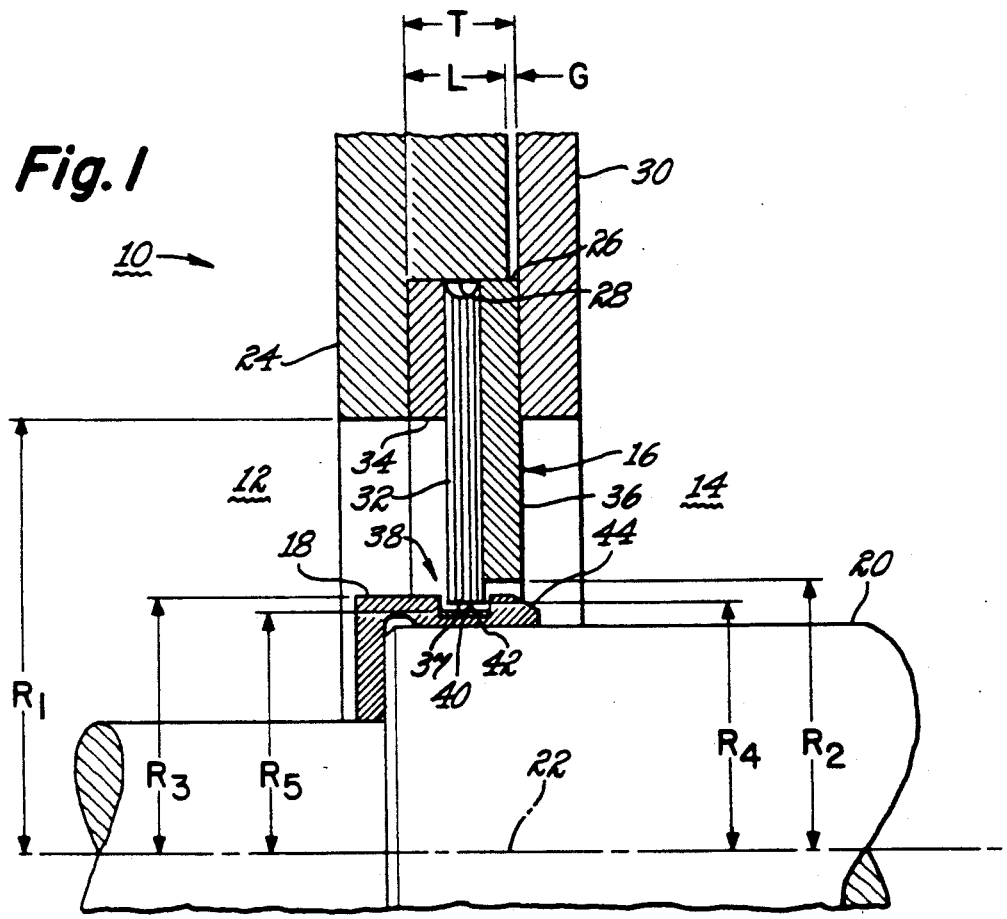
FIG. 1 is a schematic, longitudinal sectional view of a seal apparatus in accordance with one embodiment of the present invention.

Shown in FIG. 1 is an annular brush seal apparatus 10 used for restricting fluid flow between a high pressure zone 12 and a lower pressure zone 14. In an exemplary embodiment, the seal apparatus 10 is comprised of a conventional brush seal 16 and a cooperating rotating seal runner 18 fixedly attached to rotating shaft 20. The seal 16 and runner 18 are disposed concentrically about the axial rotational centerline 22 of the shaft 20. For purposes of clarity of illustration, the seal apparatus 10 is shown enlarged relative to the shaft 20. The brush seal 16 is conventionally retained in a static supporting structure 24, for example, by an interference fit between the seal outer diameter 26 and an axial bore 28 in the static structure 24. A static clamping element 30 can be fixedly attached to structure 24 using bolts (not shown) or other equivalent means, the axial length L of bore 28 being less than the thickness T of seal 16 thereby leaving an axial gap G between structure 24 and element 30 to further ensure positive retention of the seal 16 when the bolts are tightened.

The brush seal 16 is comprised of a plurality of densely compacted, generally radially disposed bristle elements 32 sandwiched between a first annular sideplate 34 and a second axially spaced annular sideplate 36. The bristle elements 32 and first and second sideplates, 34 and 36, are manufactured to form an inseparable assembly, for example by welding or brazing at the seal outer diameter 26. The seal 16 is conventionally utilized with the first sideplate 34 having a first radius $R_1$ at its inner diameter and the second sideplate 36 having a second radius $R_2$ at its inner diameter, wherein $R_1$ is greater than $R_2$ and first sideplate 34 is disposed proximate high pressure zone 12 and second sideplate 36 is disposed proximate lower pressure zone 14.

The rotating seal runner 18 is characterized as having a radius $R_3$ at its outer diameter which is less than second radius $R_2$. Bristle elements 32 collectively form an annulus having a fourth radius $R_4$ at their inner diameter, where $R_4$ is less than $R_3$. Finally, an annular grove of limited axial length, shown generally at 38, is disposed in runner 18. Groove 38 has a fifth radius $R_5$ at its outer diameter which is less than $R_4$. In summary, $R_1$ is greater than $R_2$ which is greater than $R_3$ which is greater than $R_4$ which is greater than $R_5$. According to these dimensional relationships, the distal ends 37 of bristle elements 32 are necessarily radially disposed in the annular groove 38 of the seal runner 18 and radially spaced apart from its inner radial surface 40, which is coincident with $R_5$. Inner surface 40 may be further characterized by the presence of a conventional wear coating 42 of nominal thickness. Further, a lead-in chamfer 44 can be provided on the seal runner 18 to aid in assembly of the annular seal 16 over the runner 18. It should be noted that the aforementioned dimensional relationships apply to nominal steady state operation of the equipment in which the seal apparatus 10 is installed. While the seal runner 18 is shown mounted on a rotating shaft 20 in FIG. 1 for ease of representation, it is apparent that the seal apparatus 10 could be employed at any location on a rotor where labyrinth seals are conventionally utilized. Alternately, the groove could be machined directly in the shaft for low speed, low stress applications.

Figure 2:
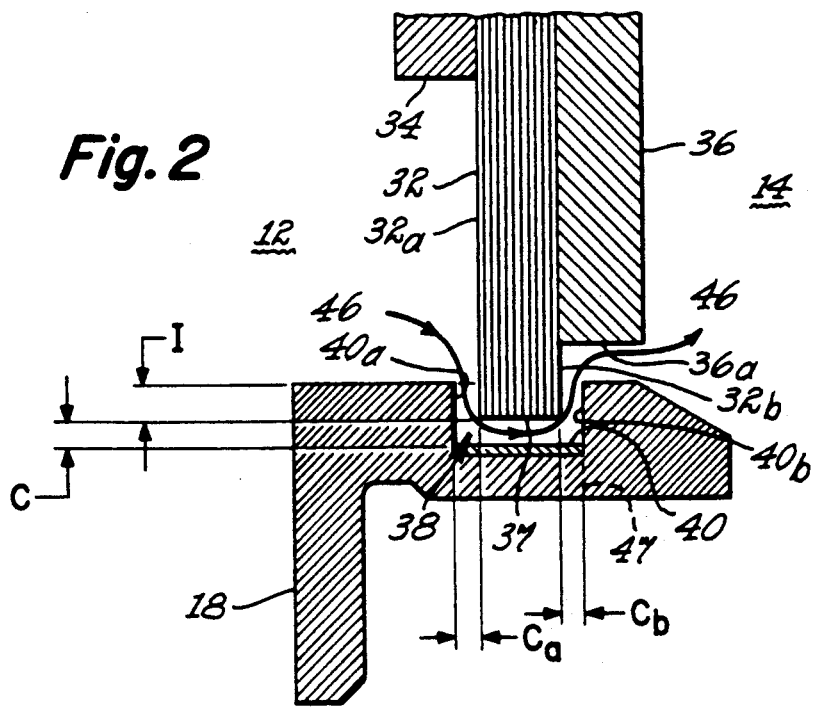
FIG. 2 is an enlarged schematic longitudinal sectional view of a portion of the seal apparatus shown in FIG. 1.

Referring now to FIG. 2, shown is an enlarged portion of the seal apparatus 10 illustrated in FIG. 1 with particular emphasis placed on the interaction between the bristle elements 32 and the seal runner 18. Additional components have been deleted for clarity. In the distal ends 37 of the bristle elements 32 into annular groove 38 is the difference between $R_3$ and $R_4$. Similarly, the overall radial clearance C between the distal ends 37 and the inner surface 40 of groove 38 is the difference between $R_4$ and $R_5$.

The bristle elements 32 proximate the first annular sideplate 34 form a first bristle plane 32a which in part bounds high pressure zone 12. Similarly, the elements 32 proximate the second sideplate 36 form a second bristle plane 32b which in part bounds lower pressure zone 14. The first plane 32a is spaced longitudinally from first annular groove sidewall 40a a first distance Ca, and second plane 32b is spaced longitudinally from second annular groove sidewall 40b a second distance Cb. During operation, high pressure fluid originating in the high pressure zone 12 must travel a tortuous path shown generally as 46 through the seal apparatus 10. The more tortuous the path 46, the greater is both the resistance to flow and the amount of energy expended by the fluid in travelling between high and lower pressure zones 12 and 14 and the lower the resultant volumetric flow rate or leakage rate. Tortuosity is defined as the quantity and abruptness of flow direction changes of path 46. Further, resistance to flow is also a function of the size of the flow passages, in this case related to radial immersion I, first distance Ca, radial clearance C, and second distance Cb. Additionally, the radially inward face 36a of second sideplate 36, which was previously defined as having a value of $R_2$, further serves the purpose of providing additional resistance to flow by turning the leakage flow a final time.

Proper sizing of the seal apparatus components is therefore important; their selection must accommodate both the desire to eliminate rubbing and wear during steady state operation and the need to afford adequate sealing during transient operating conditions. In an exemplary embodiment for application in a small gas turbine engine, it is desirable that the radial clearance C be as small as possible. Primary considerations in sizing are the nominal steady state values of $R_4$ and $R_5$ as well as the radial runouts of the bristle element distal ends 37 and the groove inner radial surface 40, respectively. For a value of $R_5$ of approximately six inches, cumulative runouts, and therefore a desirable value for the radial clearance C would be in the range of one to five mils. Radial immersion I must have a large enough value that during worst transient conditions of increased radial clearance C, the value of I remains positive. In other words, $R_3$ should always be greater than $R_4$. In this example, a typical value would be in the range of three to twenty mils. Excessively large values may cause plastic deformation of the bristle elements 37 or other difficulty during assembly adversely affecting resultant sealing capability. Further, if the pressure differential across the seal apparatus 10 is large, undesirable longitudinal deflection of the distal ends 37 may occur, as they are not fully supported by the second sideplate 36. For a lower pressure application with large transient clearance shifts, the assembly problem could be overcome by forming the runner 18 out of two pieces, for example by splitting runner 18 along the radial plane 47 of the second annular sidewall 40b, shown in dotted line in FIG. 2. Similarly, $R_2$ and $R_3$ must be sized so that during worst case transient periods of negative radial clearance C, or maximum radial immersion I, $R_2$ remains greater than $R_3$ to prevent detrimental contact between radially inward face 36a and the runner 18. For this example, a clearance value in the range of fifty to one hundred mils would be typical.

Finally, first and second distances Ca and Cb must be sized such that contact between the first and second bristle planes, 32a and 32b, and first and second sidewalls, 40a and 40b, respectively, is avoided. First and second distances Ca and Cb however should be kept to a minimum to restrict flow as much as possible. In a gas turbine engine application, the values are generally different, as rotor shift in the forward and aft longitudinal directions is not uniform. A typical value for Ca would be thirty mils, to compensate for an aft rotor deflection, and for Cb, seventy mils to compensate for a forward rotor deflection. Techniques for quantifying the magnitude and direction of rotor shifts and transient clearance changes for specific applications are known to those skilled in the art. While a groove of rectangular cross-section is shown, other contours complementary to particular brush seal configurations are contemplated, for example angled side walls.

Figure 3:
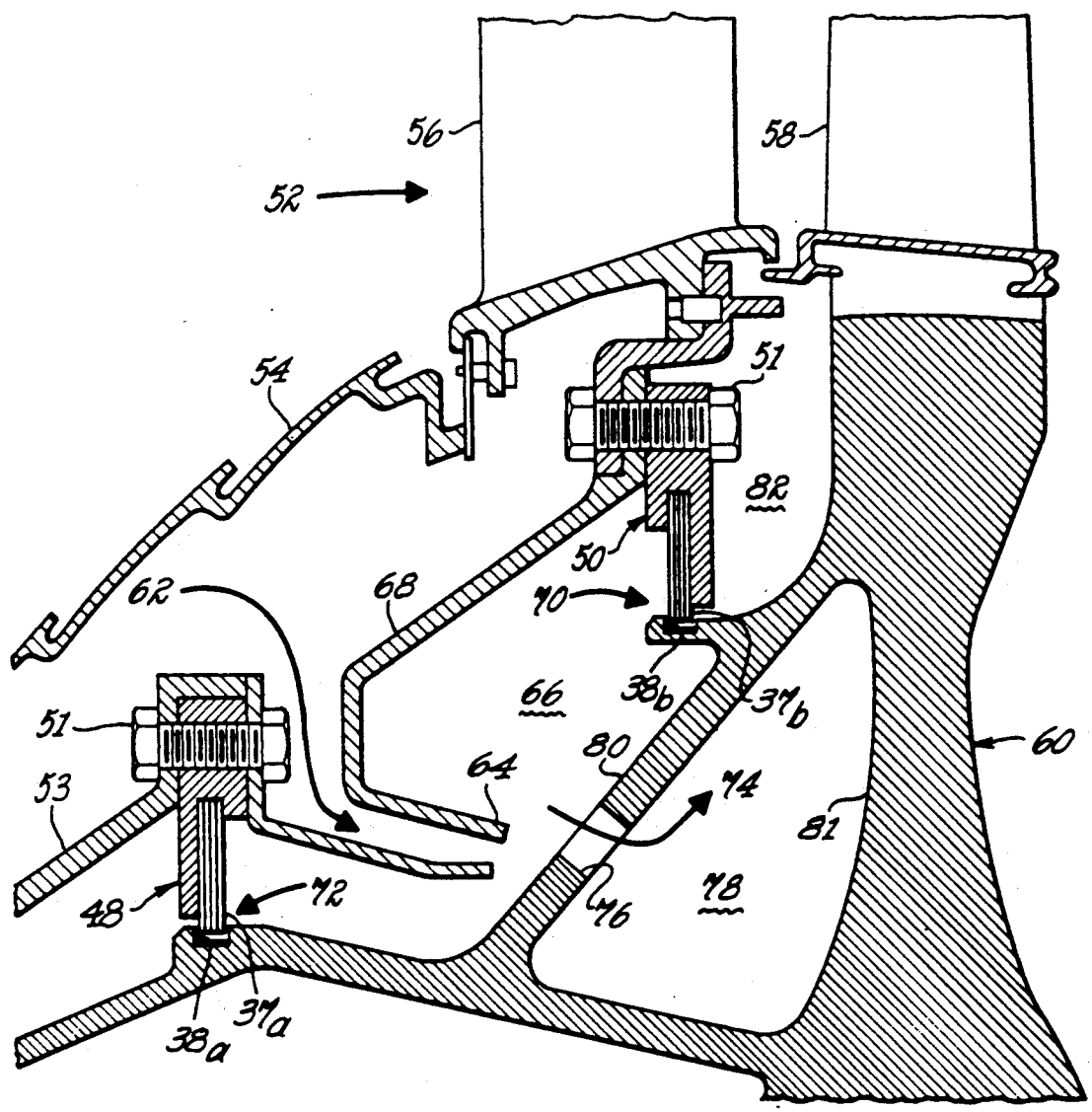
FIG. 3 is a schematic, partial longitudinal sectional view of a gas turbine engine balance piston assembly incorporating the present invention.

Referring now to FIG. 3, brush seal apparatuses are employed as inner balance piston (IBP) seal 48 and outer balance piston (OBP) seal 50 in the depicted sectional view of the hot section of a gas turbine engine. In this embodiment, seals 48 and 50 are fixedly attached to static forward and aft inner combustor casings 53 and 68 by a plurality of circumferentially spaced nut and bolt assemblies 51, although the interference fit clamped arrangement shown in FIG. 1 could also be used. Respective bristle element distal ends 37a and 37b are disposed in respective annular grooves 38a and 38b in high pressure turbine (HPT) rotor 60. Again, for ease of depiction, the rotor 60 is shown as being of unitary construction; however, it is representative of a conventional rotor assembly comprising one or more disks, blades, blade containers and a gas generator shaft, operationally connected to a compressor.

Secondary air is often used to pressurize core cavities to prevent thrust reversal on gas generator shaft bearings, offset the axial loads on the gas generator rotor caused by reaction of the rotor with the primary flow, as well as cool heated components. Hot primary flow combustion gases 52 bounded by the inner combustion liner 54 and outer combustor liner (not shown) pass through turbine nozzle 56 and are directed at a preferential angle to the blades 58 of the HPT rotor 60 for efficient work extraction. Relatively cool secondary air 62, at a higher pressure than primary gases 52 flows through accelerator 64 into a first pressure chamber 66. The accelerator 64 induces a circumferential flow component to secondary air 62 in order that it better match the rotational speed of rotor 60. First chamber 66 is bounded by IBP and OBP seals 48 and 50, rotor 60 and aft inner combustor casing 68. During operation, based on the various clearances and relative pressure drops, the flow of secondary air 62 divides into OBP seal leakage flow 70, IBP seal leakage flow 72 and blade cooling flow 74. Cooling flow 74 passe through apertures 76 in the rotor 60 into a second pressure chamber 78 before flowing radially outward into conventional blade cooling circuits (not shown) which are in fluid communication with second chamber 78. First and second generally radially extending faces 80 and 81 are sized in conjunction with the pressure in cavities 66 and 78 respectively to provide the proper balance force on the rotor 60.

OBP seal leakage flow 70 is used to purge rotor cavity 82, preventing the ingress of hot gases 52 into cavity 82 which otherwise would cause a detrimental increase in the temperature and consequent reduction in life of the rotor 60. IBP seal leakage flow 72 is conventionally used to provide positive pressurization of other internal rotor cavities, for example, bearing sumps. While the source of secondary air 72 is shown to be from the combustor for ease of depiction, other lower pressure sources, such as various stages in the compressor could be utilized depending on the requirements of the particular gas turbine engine.

Figure 4A:
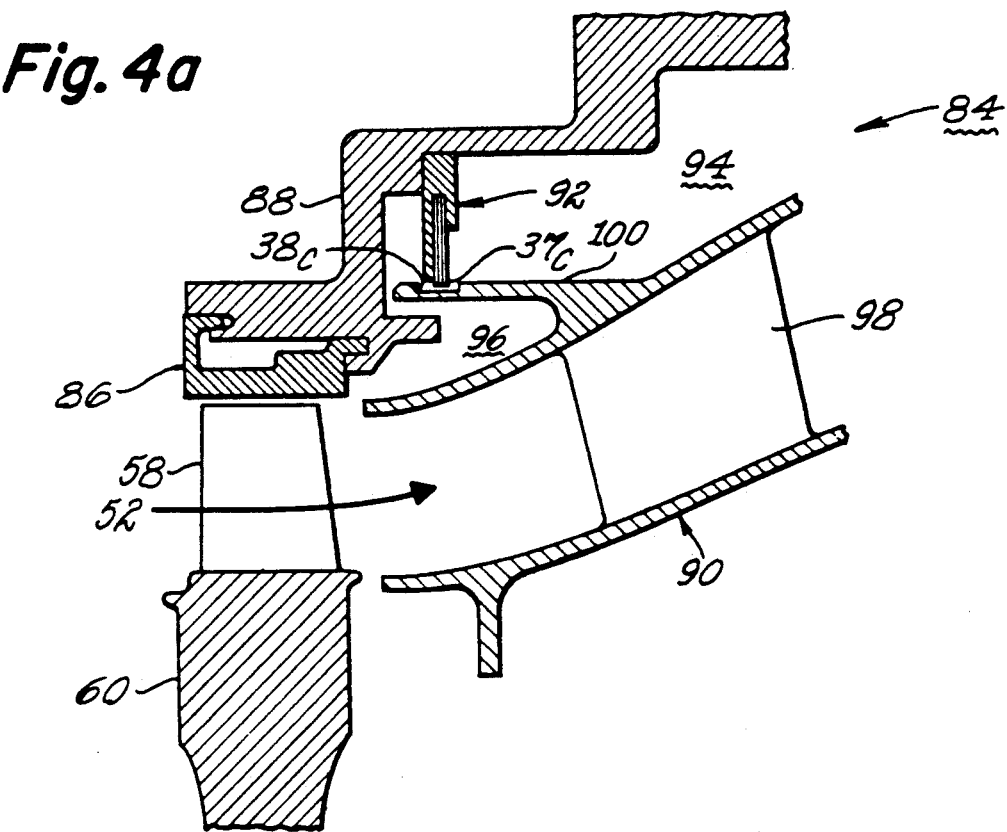
FIG. 4a is a schematic, partial longitudinal sectional view of a gas turbine engine stator assembly incorporating the present invention.

Brush seal apparatuses according to this invention may also be used in static sealing applications. FIG. 4a depicts a stator assembly 84 aft of the HPT rotor 60 which is conventionally comprised of shrouds 86 disposed radially outwardly of the blades 58 fixedly attached to a shroud support 88. After the hot combustion gases 52 pass by the blades 58, they are channeled downstream through transition duct 90 into a conventional low pressure turbine (not shown) for additional work extraction. A transition duct seal 92 is employed to allow a controlled amount of leakage from third pressure chamber 94 to purge zone 96 immediately downstream of shrouds 86. High pressure air from chamber 94 passes through internal passages (not shown) in transition duct vanes 98 to cool the vanes 98 and provide pressurized air to internal engine cavities.

The bristle element distal ends 37c of the brush seal apparatus utilized as duct seal 92 are disposed in annular groove 38c in an axially extending leg 100 of the transition duct 90. Seal 92 is conventionally retained in shroud support 88, for example by a slight interference fit. If warranted, additional attachment means could be employed.

Figure 4B:
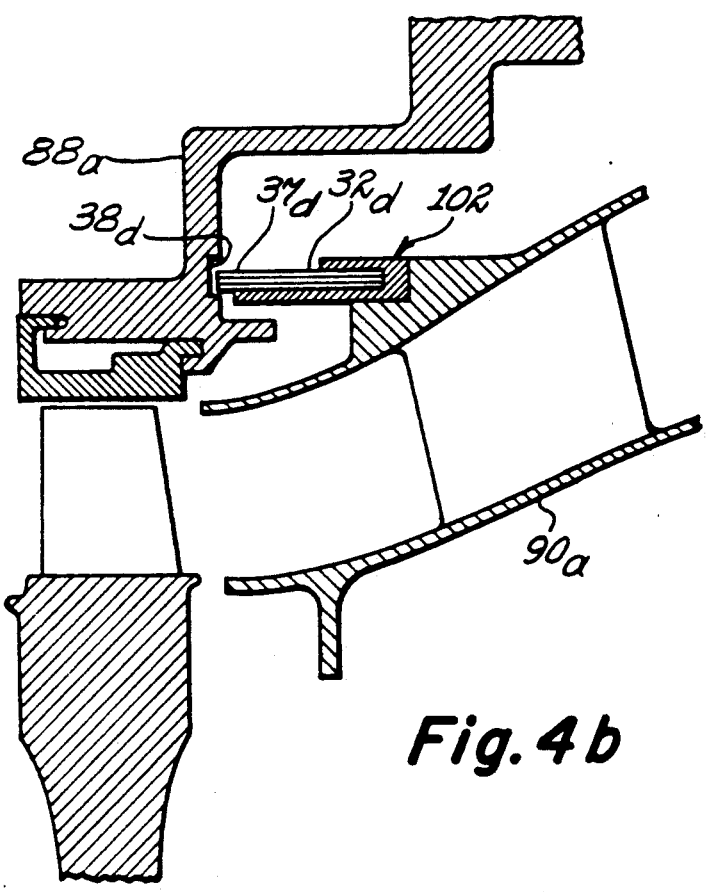
FIG. 4b is an alternate schematic, partial longitudinal sectional view of the gas turbine engine stator assembly shown in FIG. 4a incorporating the present invention.

Depending on a variety of factors such as the direction, magnitude and frequency of relative movement between shroud support 88 and transition duct 90; difficulty of assembly or disassembly; and cost of manufacture, an alternate configuration depicted in FIG. 4b could be employed. Here, bristle elements 32d of circumferential transition duct seal 102 are generally axially oriented. Seal 102 is fixedly attached to transition duct 90a, its bristle element distal ends 37d being disposed in a downstream opening annular groove 38d in shroud support 88a. The function and operation of seal 102 is similar to that of seal 92 in FIG. 4a.

Figure 5A:
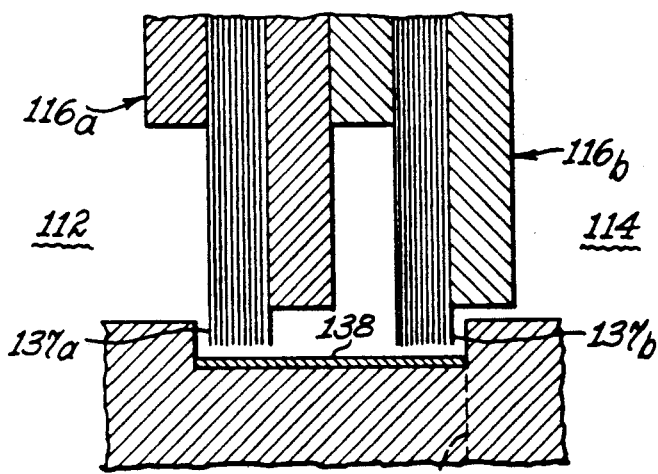
FIG. 5a is a schematic, longitudinal sectional view of a serial brush seal apparatus in accordance with an alternate embodiment of the present invention.
Figure 5B:
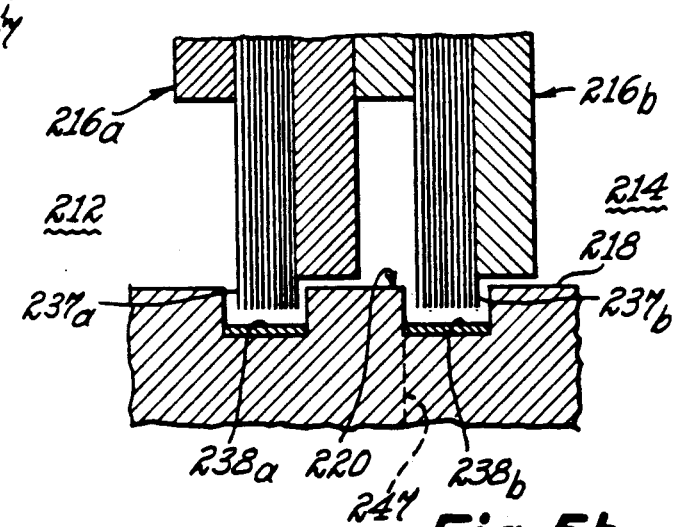
FIG. 5b is a schematic, longitudinal sectional view of a serial brush seal apparatus in accordance with a further embodiment of the present invention.
Figure 5C:
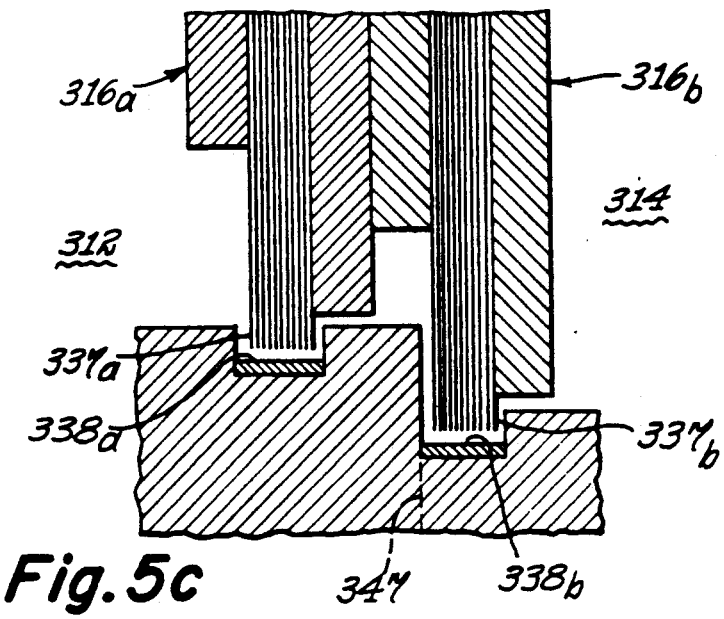
FIG. 5c is a schematic, longitudinal sectional view of a stepped serial brush seal apparatus in accordance with an additional embodiment of the present invention.

Lastly, FIGS. 5a, 5b, and 5c depict alternate embodiments of the invention particularly suited for high pressure applications, or where leakage flow rates must be reduced further than the configurations heretofore described. The brush seal apparatus delineated in FIG. 5a is comprised of two identical brush seals 116a and 116b for restricting flow between high pressure zone 112 and lower pressure zone 114. Seals 116a and 116b are configured in serial sealing relationship, having their respective bristle element distal ends 137a and 137b disposed in a common annular groove 138. In FIG. 5b, the apparatus delineated is similarly configured as that in FIG. 5a; however, distal ends 237a and 237b of respective brush seals 216a and 216b are disposed in distinct annular grooves 238a and 238b, respectively, in annular surface 218. This configuration, having a more tortuous leakage path due to the projection 220, is more effective in reducing leakage flow rate for a given pressure drop between high pressure zone 212 and lower pressure zone 214 than that depicted in FIG. 5a. Finally in FIG. 5c, shown is a stepped brush seal apparatus where two brush seals 316a and 316b are arranged in serial sealing relationship between high pressure zone 312 and lower pressure zone 314. Distal ends 337a and 337b are disposed in respective annular grooves 338a and 338b which are of differing radial dimension. This feature, while requiring seals of different sizes adds an additional degree of tortuosity to the leakage path increasing resistance to flow and thereby further reducing the volumetric leakage flow rate. Again, as represented by dotted line 47 in FIG. 2, the component in which the annular grooves are disposed may be of unitary construction or comprised of a plurality of elements to allow for ease of assembly or disassembly. Representative parting planes are shown as dotted lines 147, 247 and 347 in FIGS. 5a, 5b, and 5c respectively, although any of a variety of other planar locations could be chosen dependent on the particular configuration of the subject application. Alternately or additionally, the brush seal may be comprised of a series of cooperating arcuate segments which collectively form a complete annular seal when installed. Further, the embodiments shown in FIGS. 5a, 5b and 5c are applicable to dynamic as well as static sealing applications and can be used with radially or axially oriented brush seals.

It is contemplated that this invention has broad application in not only gas turbine engines, but in a wide variety of mechanical and other devices where conventional sealing apparatuses are used to restrict flow between zones of differing pressure, and is also particularly suited for use where contamination of the leakage flow caused by wear of the sealing apparatus is detrimental to the operation of the device.

While there have been described herein what are considered to be preferred embodiments of the present invention, other modifications of the invention will be apparent to those skilled in the art from the teachings herein, and it is therefore desired to be secured in the appended claims all such modifications as fall within the true spirit and scope of the invention.

Accordingly, what is desired to be secured by Letters Patent of the United States is the invention as defined and differentiated in the following claims:

1. A brush seal apparatus comprising:
   brush seal means disposed between a high pressure zone and a lower pressure zone and fixedly attached to a first member; and
   a second member having a groove means for receiving a compliant portion of said seal means therein in close proximity to and spaced from internal surfaces of said groove means for restricting fluid flow between said high pressure zone and said lower pressure zone, wherein said brush seal means comprises at least one annular brush seal having a centerpoint;
   said seal compliant portion comprises free first ends of a plurality of bristle elements having second ends permanently attached to an annular ring of said brush seal; and
   said groove means comprises at least one annular groove having an internal contour substantially complementary to an external contour of said seal compliant portion.

2. The invention according to claim 1 wherein:
   said first member comprises a static structure;
   said second member comprises a structure rotatable relative to, spaced radially from, and encircled by said static structure, said rotatable structure having an axis of rotation which passes through said centerpoint of said brush seal; and
   said free bristle ends are disposed radially inwardly from said annular ring.

3. The invention according to claim 1 wherein:
   said first member comprises a first static structure;
   said second member comprises a second static structure spaced radially from said first static structure; and
   said free bristle ends are disposed radially inwardly from said annular ring.

4. The invention according to claim 1 wherein:
   said first member comprises a first static structure;
   said second member comprises a second static structure spaced axially from said first static structure; and
   said free bristle ends are disposed axially from said annular ring.

5. The invention according to claim 1 wherein:
   said brush seal means comprises a plurality of proximally located brush seals disposed generally concentrically about said groove means and each having respective free bristle ends disposed in close proximity to and spaced from internal surfaces of a single groove.

6. The invention according to claim 1 wherein:
   said brush seal means comprises a plurality of proximally located brush seals disposed generally concentrically about said groove means and each having respective free bristle ends disposed in close proximity to and spaced from internal surfaces of a respective one of a plurality of separate grooves.

7. The invention according to claim 6 wherein:
said separate grooves are of differing diametral dimension.

8. A balance piston apparatus in a gas turbine engine comprising:
a rotor;
a static structure;
an outer balance piston seal; and
an inner balance piston seal;
said inner and outer seals defining, in cooperation with said rotor and said static structure, a balance piston chamber;
said inner and outer seals comprising annular brush seals affixed to said static structure and having respective annular rings with permanently attached generally radially inwardly disposed bristle elements wherein free distal portions of said bristle elements of said inner and outer seals are disposed in first and second annular grooves in said rotor such that said elements are in close proximity to, and spaced from internal surfaces of respective ones of said grooves in said rotor during steady state operation of said engine.

9. The invention according to claim 8 wherein:
said brush seals and said first and second grooves are predeterminately sized such that during all operating conditions of said engine, said distal portions of said bristle elements remain at least minimally radially immersed in said first and second grooves.

* * * * *